F. C. OLIN.
TRACTOR.
APPLICATION FILED APR. 26, 1916.
1,366,413.
Patented Jan. 25, 1921.
2 SHEETS—SHEET 2.
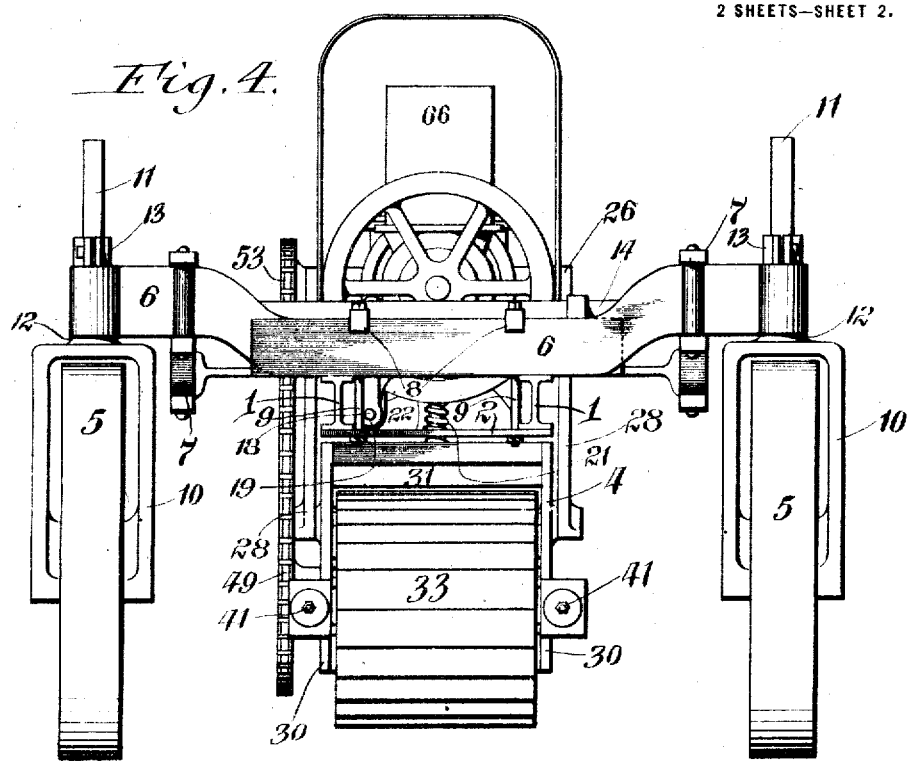
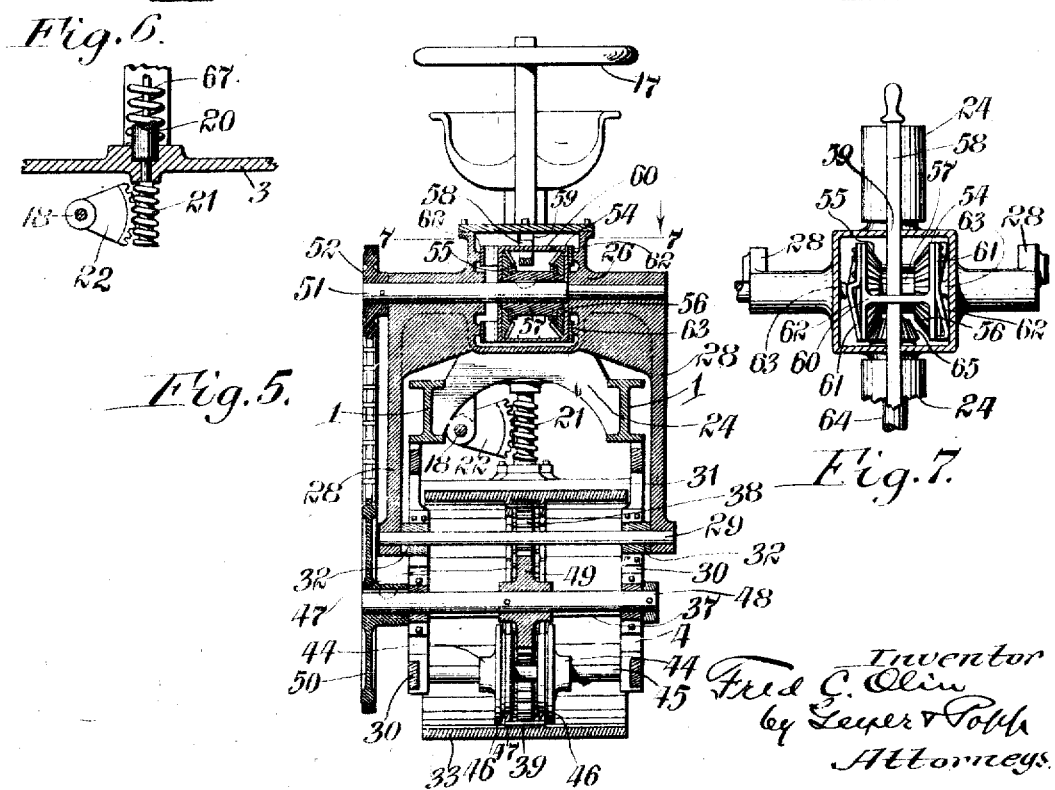

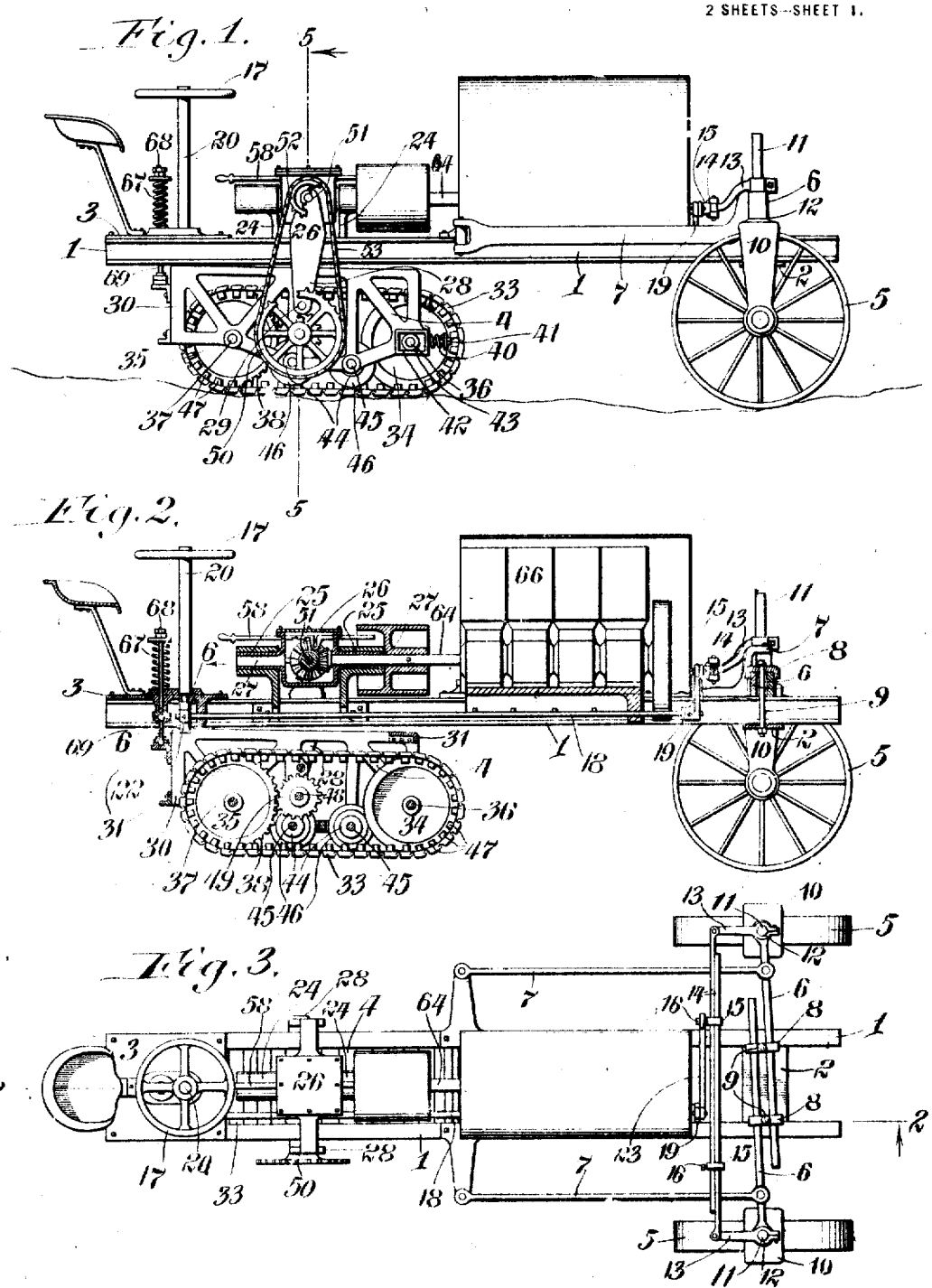

UNITED STATES PATENT OFFICE.

FRED C. OLIN, OF BUFFALO, NEW YORK, ASSIGNOR TO OLIN GAS ENGINE COMPANY, OF BUFFALO, NEW YORK, A CORPORATION OF NEW YORK.

TRACTOR 1,366,413.

Specification of Letters Patent. Patented Jan. 25, 1921.

Application filed April 26, 1916. Serial No. 93,621.

*To all whom it may concern:*

Be it known that I, FRED C. OLIN, a citizen of the United States, residing at Buffalo, in the county of Erie and State of New York, have invented new and useful Improvements in Tractors, of which the following is a specification.

This invention relates to a tractor or traction engine for hauling heavy loads over rough ground and more particularly to tractors in which a driving endless-belt tread is employed.

One of the objects of this invention is to provide a tractor in which the ground gripping member is so mounted as to be capable of swinging about horizontal longitudinal and transverse axes relatively to the main or chassis frame of the tractor so as to accommodate itself to the contour of the ground being traversed and to thereby obtain a maximum tractive effort and to provide a driving endless belt tread structure which will constantly bear upon the ground with its entire tractive surface, and also provide a strong and simple driving mechanism which will allow the tractor to be readily reversed.

Another object of this invention is to provide simple and efficient means for mounting the steering wheels of the tractor on the frame and connecting the same with the operating mechanism so that they can be readily adjusted transversely on the main frame for obtaining the desired gage or track of these wheels.

In the accompanying drawings:

Figure 1 is a side elevation of my improved tractor with a portion broken away. Fig. 2 is a vertical longitudinal section thereof taken on line 2—2, Fig. 3. Fig. 3 is a top plan view of the same. Fig. 4 is a front elevation of the tractor, on an enlarged scale. Fig. 5 is a vertical transverse section, on an enlarged scale, taken on line 5—5, Fig. 1. Fig. 6 is a fragmentary vertical transverse section taken on line 6—6, Fig. 2. Fig. 7 is a fragmentary horizontal section, on an enlarged scale, taken on line 7—7, Fig. 5.

Similar characters of reference indicate corresponding parts throughout the several views.

The main or chassis frame of the tractor may be of any suitable form but that shown is simple and preferable and comprises two longitudinal sills or bars 1, 1 positioned side by side and secured together by means of the horizontal tie plates 2 and 3 arranged transversely at the front and rear ends respectively of the longitudinal bars. This frame is supported at one end preferably its rear end by a ground gripper 4 preferably of the caterpillar type and also by one or more steering and supporting wheels 5—5 which are preferably mounted on the forward end of the chassis frame, as shown. In the preferred construction said forward steering supporting wheels 5 are so arranged on the frame that the transverse distance gage or track between them may be varied to suit the particular nature of the ground traversed, this being desirable because the tractor is more particularly designed for hauling different kinds of farming machinery over the soil in its various stages of cultivation. This is accomplished by providing two horizontal axle sections or bars 6, 6, each of which carries one of the supporting wheels at its outer end and which may be adjusted transversely relatively to the chassis frame and firmly secured thereto. Each of said axle sections is preferably also connected adjacent to its outer end with the chassis frame by means of a thrust rod 7 which is pivotally connected with its forward end to the outer end of said axle section and pivotally connected at its rear end to the main frame so as to be capable of swinging horizontally and transversely relatively to the main frame and axle. This construction permits of readily adjusting the distance between the forward steering or supporting wheels and still retaining them in transverse alinement, besides relieving the backward thrusts to which the axle sections are subjected.

The inner ends of the axle sections or bars are preferably arranged one behind the other and the upper side of the front part of the main frame and are adjustably connected with each other and with the main frame by two clips 8 engaging with the upper sides of the axle bars or sections and two upright clamping bolts 9 arranged between the overlapping parts of said axle bars or sections and each connecting one of the clips with the adjacent part of the main frame.

Each of the steering wheels is mounted in a steering fork 10 which latter is provided at its upper end with a pivot or stem 11 which is journaled in an upright bearing 12 in the outer end of one of the axle sections. The two steering wheels are caused to turn in unison by two rock arms 13, 13 projecting rearwardly from the fork pivots 11 and two shifting rod sections 14 pivotally connected at their outer ends, respectively, with the rear ends of the steering arms 13 while their inner ends overlap each other and are adjustably connected by collars 15 embracing said shifting rods and clamping or set screws 16 arranged in said collars and operating to secure said shifting rods together.

The steering of the tractor along the ground is accomplished by turning a hand wheel 17 which rotates a steering shaft 18 that is provided with an upwardly extending arm 19. The steering shaft 18 is journaled lengthwise in suitable bearings on the main frame and the arm 19 projects upwardly from the front end thereof. The steering wheel 17 is mounted on the upper end of an upright steering shaft 20 which is journaled in a suitable bearing in the rear part of the main frame and motion may be transmitted from this upright steering shaft 20 to the horizontal steering shaft 18 by means of a worm 21 arranged on the lower end of the upright shaft 20 and meshing with a worm gear segment 22 on the rear end of the horizontal shaft 18, as shown in Figs. 2 and 6. Pivotally connected to the upper end of the arm 19 is a connecting rod 23 which, in turn, is pivotally connected to one of the clamping collars 15. The rod sections 14 may be first adjusted longitudinally relatively to each other and then secured rigidly together, thus permitting the forward supporting wheels to be alined so that their axes are parallel, irrespective of what the transverse distance between them may be.

Adjacent to the tread belt or ground gripper and secured to the chassis frame are two upwardly extending brackets 24 which are arranged one behind the other and which are provided at their upper ends with longitudinal bearings 25 arranged in longitudinal alinement. Between said brackets 24 is arranged a gimbal or swivel body 26 which is provided at its front and rear ends with hollow pivot arms or trunnions 27 which are journaled in the bearings 25, thereby permitting said gimbal or swivel body to swing transversely about a horizontal axis relatively to the chassis frame. On its laterally opposite sides the gimbal body is provided with depending arms 28 which swing with said gimbal body and project downwardly along opposite sides of the main frame. The tread belt or ground gripper 4 is pivotally mounted on the lower ends of said depending arms 28 by means of a horizontal transverse pivot shaft 29 which permits said ground gripper to swing vertically about a horizontal axis relatively to said gimbal body. It will now be apparent that said ground gripper may swing vertically relatively to the main frame about horizontal longitudinal and transverse axes, this being due to the universal joint or connection which the swivel body forms between the main frame and the ground gripper by this organization of the parts.

The ground gripper comprises a gripper frame arranged below the rear part of the main frame and having two side pieces 30 arranged lengthwise side by side and cross pieces 31 connecting the side pieces. About midway between its front and rear ends and its top and bottom the gripper frame is provided with transverse bearings 32 in which the pivot shaft 29 is journaled and forms a pivotal connection between the gripper frame and the swivel or gimbal frame.

Between the side pieces of the gripper frame is arranged a tread belt of endless form which comprises a plurality of pivotally connected links, shoes or sections 33 and this belt is so disposed that it forms a lower horizontal operative stretch, an upper horizontal inoperative stretch and front and rear turns connecting said upper and lower stretches. This tread belt passes with its front and rear turns around front and rear wheels 34, 35 which are mounted respectively on transverse shafts 36, 37 which are journaled in suitable bearings on the front and rear parts of the side pieces of the gripper frame. The front wheel 34 is preferably driven by the tread belt and provided with a plain periphery which is engaged by the inner side of this belt. The rear wheel 35, however, serves as the driver of this belt and for this purpose is provided on its periphery with gear teeth 38 which mesh with transverse pins 39 mounted on the inner side of the tread belt, as shown in Fig. 5. That this belt tread may always be taut around the driving and driven wheels 35, 34 the forward transverse shaft 36 upon which the driven wheel is journaled is preferably pressed forward yieldingly by means of two compression springs 40 whose rear ends bear against the front end of the gripper frame and whose forward ends press against the heads of two adjusting rods 41 which are secured respectively to journal boxes 42 sliding in longitudinal guideways 43 on the gripper frame and receiving opposite ends of the transverse shaft 36 of the driven wheel 34. While they are not essential, four flanged guide wheels 44 are preferably journaled on transverse shafts 45 in the gripper frame for the purpose of taking the upward pressure exerted against the lower stretch of the tread belt. These flanged guide wheels also retain said belt transversely in the gripper frame, being provided with laterally projecting annular flanges 46 which are adapted to engage with the outer side of the lugs or shoulders 47 arranged on the inner side of the sections 33 of said tread belt.

Journaled transversely in the gripper frame and close to the pivot shaft 29 is an intermediate shaft 48 provided centrally with a small gear wheel 49 which is adapted to mesh with the teeth 38 of the driving gear wheel 35, said intermediate shaft being also provided on one of its outer ends with a large sprocket wheel 50. Thus by turning said large sprocket wheel, the driving wheel 35 will be caused to rotate and the latter will in turn drive the tread belt thereby causing the whole tractor to be propelled while the lower stretch of the tread belt engages with the ground.

On the upper part of the gimbal body is journaled a transverse driving shaft 51 which is provided at one of its ends with a small sprocket wheel 52. A chain belt 53 passes around both said small sprocket wheel 52 and the large sprocket wheel 50 of the intermediate shaft 48, thus causing both sprockets to rotate in unison. Slidably mounted on said transverse driving shaft 51, as best shown in Fig. 5, is a container or cage 54 and rotating in said cage, as a single unit, are two inwardly facing, driven bevel gears 55, 56 both of which are secured to a sliding sleeve 57 which is splined on said transverse shaft so as to be compelled to turn with this shaft but be capable of sliding longitudinally along the same. The cage 54 does not rotate continuously with the shaft 51 but may be partially rotated on the same by means of a longitudinal shifting rod 58 mounted on the gimbal body so as to be slidable lengthwise thereon. This shifting rod is provided intermediate of its length with a vertical slot 59 which engages a transverse tie bar 60 that connects the two upper portions of the end plates of said cage 54. Accompanying this partial rotation of the cage on the driving shaft is a longitudinal movement along the axis of the same. This is preferably accomplished by securing to each of the end plates of said cage a flat rim or ring 61 which is provided with the two inclined wedge faces 55 that are adapted to engage a pair of inwardly projecting lugs 63 formed on the gimbal body, so that when the cage is rotated by means of the shifting rod 58 these wedge faces ride upon their respective coöperating lugs and cause the cage to move longitudinally along the driving shaft. Inasmuch as there is a pair of wedge faces on either longitudinal end of the cage 54 it follows that a proper movement of the shifting rod 58 will positively move said cage with its accompanying set of gears into any desired position along the axis of the driving shaft and hold it in that position.

Longitudinally journaled on the chassis frame is a motor shaft 64 in longitudinal alinement with the bearings 25 which constitute the principal axis of the gimbal body 26. The rear end of said motor shaft is provided with a driving bevel gear 65 which is adapted to mesh with either of the driven bevel gears 55, 56 on the sliding sleeve 57. This motor shaft is driven by a gasolene engine 66 or other source of power which may be mounted in the forward part of the chassis frame. It is evident that by manipulating the shifting rod 58 either one or the other or neither of the driven bevel gears 55, 56 may be engaged with the driving bevel gear 65 so that the tractor may, at will, be driven ahead, reversed or allowed to stand idle with the motor rotating. The driving or propelling force which is transmitted by the chain belt 53 in the arrangement shown in the drawings, tends somewhat to tilt the gripper frame relatively to the chassis frame and although this torque action may be eliminated by employing other forms of power drives, the arrangement shown is commercially preferable. This tilting action is compensated for by a spring 67 which may be a compression spring, mounted as shown adjacent to the rear end of the gripper frame and bearing with its lower face against the upper side of the chassis frame. The upper end of said spring 67 yieldingly pushes upwardly a pull rod 68 which is connected at its lower end by a ball jointed link 69 with a rear cross bar 31 of the gripper frame.

The tractor is thus seen to be readily adjustable to do the particular work it has to perform most effectively, the entire bottom of the tread belt will always be in contact with the ground so that the tractor will pull the heaviest of loads steadily over very rough ground, the heavy bending side strains on the tread belt are largely eliminated due to the pivotal suspension and the tractor may also be readily reversed or entirely thrown out of gear.

I claim as my invention:

1. A tractor comprising a main frame, an engine arranged on the main frame, a ground gripper having a gripper frame and a movable tread, a universal connection between the frame of the ground gripper and said main frame comprising a body pivoted on said main frame, and means for transmitting motion from said engine to said tread having a rotary member arranged concentrically with the pivotal connection between said main frame and said body.

2. A tractor comprising a main frame, an engine arranged on said main frame, a ground gripper having a gripper frame and a movable tread, a universal connection between the frame of the ground gripper and said main frame comprising a body pivotally connected with said main frame on an axis arranged lengthwise and horizontally and also pivotally connected with said gripper frame on an axis arranged horizontally and transversely, and means for transmitting motion from said engine to said tread having a rotary member arranged concentrically with the pivotal connection between said main frame and said body.

3. A tractor comprising a main frame, an engine mounted on said main frame, a forward supporting wheel mounted on said main frame, a rear ground gripper, a gimbal body provided with two axes perpendicular to each other one of which remains in constant relation with the main frame and the other of which remains in constant relation with said rear ground gripper, said gimbal body connecting said main frame with said rear ground gripper, and means for transmitting motion from said engine to said rear ground gripper having a rotary member journaled concentrically with the pivotal connection between said main frame and said gimbal body.

4. A tractor comprising a main frame, a gimbal body pivoted on said frame, a motor shaft journaled on said frame, a driving shaft mounted in said gimbal body on an axis perpendicular to the axis of the pivotal connection between said main frame and the gimbal body, and means for transmitting power from said motor shaft to said driving shaft.

5. A tractor comprising a main frame, a forward supporting wheel mounted on said frame, a rear ground gripper, a gimbal body provided with two axes perpendicular to each other, one of which remains in constant relation with the frame and the other of which remains in constant relation with the said ground gripper, a driving shaft journaled in the gimbal body, and means for transmitting power to said ground gripper from said driving shaft.

6. A tractor comprising a main frame, a forward supporting wheel mounted on said frame, a gimbal body journaled on said frame, a tilting frame pivoted to said gimbal body, a ground gripper mounted on the tilting frame, means for driving said ground gripper and a spring interposed between said tilting frame and the main frame.

7. A tractor comprising a main frame, a gimbal body journaled on said frame, a tilting frame pivoted to said body, a driving shaft rotatably mounted in said body on an axis which is perpendicular to the axis of the pivotal connection between said main frame and the gimbal body, a motor shaft journaled on said frame, and means for transmitting power from said motor shaft to said driving shaft.

8. A tractor comprising a main frame, a forward supporting wheel mounted on said frame, a driving shaft, a gimbal body provided with two axes perpendicular to each other one of which remains in constant relation with the main frame and the other of which remains in constant relation with the axis of said driving shaft, a motor shaft journaled in said gimbal body perpendicular to a plane passing through the axis of said intermediate shaft, a ground gripper mounted on said gimbal body, said driving shaft and means for transmitting power from said motor shaft to said driving shaft and also from said driving shaft to said ground gripper.

9. A tractor comprising a main frame, a forward supporting wheel mounted on said frame, a gimbal body having two substantially horizontal bearings perpendicular to each other, a motor shaft journaled in the main frame and in one of the bearings of the gimbal body, a driving shaft journaled in the other bearing of the gimbal body, an arm depending from said body, a tilting frame pivoted to the lower end of said arm, a ground gripper mounted on said tilting frame, and means for transmitting power from the motor shaft to said driving shaft and thence to the ground gripper.

10. A tractor comprising a main frame, a forward supporting wheel mounted on said frame, a gimbal body horizontally journaled in said frame, a driving shaft journaled in said body perpendicular to the axis of the pivotal connection between said body and main frame, a motor shaft journaled in said body in line with the axis of the pivotal connection between said body and main frame and provided with a driving gear, two driven gears slidably mounted on said driving shaft either of which may be caused to mesh with the driving gear, a ground gripper mounted on the gimbal body, and means for transmitting power from said driving shaft to said ground gripper.

11. A tractor comprising a main frame, a gimbal body pivoted on said frame, a tilting frame pivoted to said body, a driving wheel and a driven wheel journaled in said frame on axes which are perpendicular to the axis of the pivotal connection between said main frame and said body, a tread belt passing around said driving and driven wheels, and means for driving said driving wheel.

12. A tractor comprising a main frame, a motor shaft journaled on said frame, a gimbal body journaled on said main frame axially in line with said motor shaft and provided with a depending arm, a tilting frame pivoted on said arm on an axis perpendicular to the axis of the pivotal connection between said main frame and said body, a driving and a driven wheel pivotally mounted on said tilting frame and having their axes parallel with the pivotal connection between said body and the tilting frame, a driving shaft journaled in said body parallel with the axis of the driving wheel, a supplemental shaft journaled transversely in the tilting frame, a tread belt passing around said driving and driven wheels, and means for transmitting power from said motor shaft successively to said driving shaft, supplemental shaft and the driving wheel.

FRED C. OLIN.